United States Patent [19]

Oshikoshi

[11] Patent Number: 4,712,909
[45] Date of Patent: Dec. 15, 1987

[54] CRT COMPOSITE IMAGE PRINTING METHOD AND APPARATUS

[75] Inventor: Yuji Oshikoshi, Tokyo, Japan

[73] Assignee: Fuji Photo Film Co., Ltd., Kanagawa, Japan

[21] Appl. No.: 898,584

[22] Filed: Aug. 21, 1986

[30] Foreign Application Priority Data

| Aug. 21, 1985 | [JP] | Japan | 60-181686 |
| Aug. 26, 1985 | [JP] | Japan | 60-185795 |
| Sep. 17, 1985 | [JP] | Japan | 60-203536 |

[51] Int. Cl.$^4$ ............................................. G03B 27/80
[52] U.S. Cl. .................................... 355/20; 355/40; 355/77; 354/109
[58] Field of Search ................ 355/40, 41, 46, 77, 355/20; 364/523; 354/109, 110; 346/110 R; 358/302, 300

[56] References Cited

U.S. PATENT DOCUMENTS

| 3,796,487 | 3/1974 | Voorhees | 355/20 X |
| 4,540,259 | 9/1985 | Blakely et al. | 354/109 |

*Primary Examiner*—L. T. Hix
*Assistant Examiner*—D. Rutledge
*Attorney, Agent, or Firm*—Young & Thompson

[57] ABSTRACT

A CRT composite image printing method and apparatus for making a print of a composite image comprising a human figure and personal data relating to the human figure in order to provide a card with picture. The apparatus has a device for recording and reproducing a number of figure images and a device preparing a number of sets of personal data, these figure images and set of personal data being composed by a computer and displayed on a CRT as a composite image to which a printing paper is exposed to provide a print sheet from which the picture card is made.

16 Claims, 15 Drawing Figures

CRT COMPOSITE IMAGE PRINTING METHOD AND APPARATUS

BACKGROUND OF THE INVENTION

The present invention relates to a CRT composite image printing method and apparatus for making a print of a composite image comprising a human figure and personal data, and more particularly to a CRT composite image printing method and apparatus which is suitable for a photo identity card manufacture system.

In recent years, there have been numerous kinds of personal cards such as identification (ID) cards, driving licenses, credit cards, bank cards, oil company cards, a commutation and season tickets and so on. Some of these cards are essential in particular to prove the cardholder's identity; for example an ID card such as an employee ID card, a driver's license and so on, are provided with a picture of the face of the cardholder as well as personal data including the name, date of birth, address, etc.

As the card with a picture of a face, there is known a card comprising a blank sheet or core sheet and cover sheets attached thereto. On the blank sheet there are pre-printed captions for personal data. Having entered the necessary personal data with the aid of a typewriter and having then attached a picture of the face thereto, the core sheet is sandwiched between the cover sheets and pressure-welded to the cover sheets with heat.

The card thus made has a difference in sheet level at the edges of the picture. In order to avoid this difference, it is known to provide an opening in the core sheet in which the picture is fitted.

The cards made in this way suffer from the risk of being possibly altered by replacing the picture. For the prevention of the replacement of pictures, it is known to provide a print of a blank card which has a portion of the picture of the face attached thereto, but no personal data. The print, after having attached a label with the personal data separately provided, is also sandwiched between the cover sheets.

Otherwise, a blank sheet on which the personal data have already been typewritten or entered otherwise is set in a camera. Upon taking a picture of the human face, the images of the blank sheet and the human face are formed on a reversal color printing paper simultaneously and compositely, but by different taking lenses.

Either technique described above raises the problems that the production of the card with a picture is costly in labor and time and that wrong combinations of pictures and personal data can be made, particularly when a large number of cards are required to be made at a time.

Another problem is in the renewal of cards. When making a new personal card at the expiration of an existing card, although it would suffice to replace only the picture on the card with a recent one because there is usually no change in personal data, nevertheless it is necessary to enter the same data as in the existing card on a new blank sheet. This means that a new personal card has to be made at the expiration of every existing pesonal card.

On the other hand, a recent tendency in personal cards is toward color cards. For providing color personal cards with a high quality, it is known to use a CRT image printing apparatus which cooperates with a black-and-white CRT and three color filters, namely, blue, green and red. In the CRT image printing apparatus there is sequentially displayed in a brightness pattern on the screen of the black-and-white CRT, three black-and-white images corresponding to blue, green and red images in this order. Upon exposure, the color filters are selectively correspondingly used to translate the black-and-white images to the three primary color images for multiple exposure.

In the CRT image printing apparatus, in order to obtain a desirable exposure density of print, it suffices to provide only several seconds of exposure for each of the blue and green images; however hundreds of seconds of exposure is required for red. Therefore, the CRT image printing apparatus operates inefficiently, in particular when a large number of color cards such as company ID cards, etc. are required to be made at a time. From the results of various investigations, it was found by the present inventor that the time-consuming exposure for red was due to a low emission luminance (radiation energy) of the black-and-white CRT in the range of wavelengths of red and a low sensitivity of color photographic or printing paper to the range of wavelengths of red.

Figure 1:
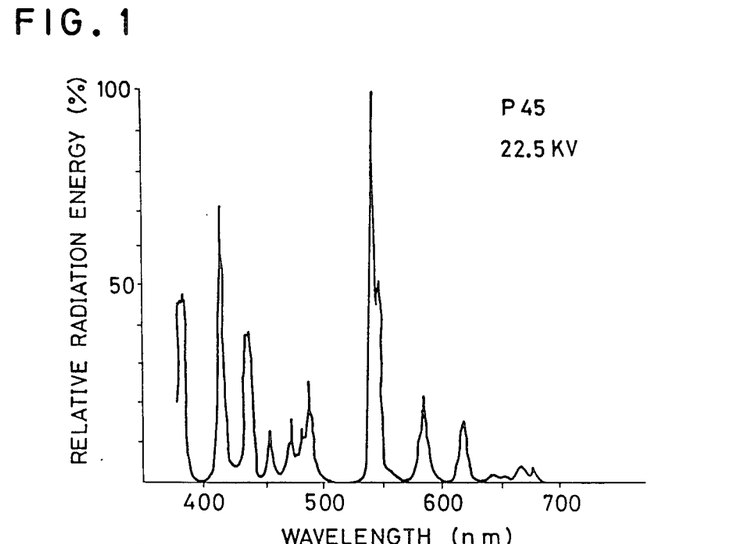
FIG. 1 is a graph showing the spectral luminance characteristic of a conventional black-and-white CRT wherein P45 fluorescent substance is used.

Usual black-and-white CRTs contain a fluorescent substance, P45 in E I A system which is composed of $Y_2O_2S$ and Tb. The fluorescent substance P45, as shown in FIG. 1, has a spectral luminance characteristic having a maximum radiation peak at about 540 nm and which is mostly comprised of wavelengths shorter than about 600 nm.

Figure 2:
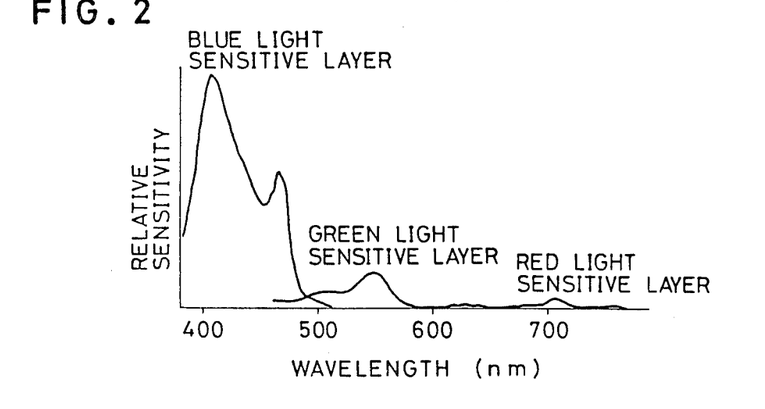
FIG. 2 is a graph showing the spectral sensitivity of a color printing paper.

On the other hand, usual color printing papers have a spectral sensitivity distribution as shown in FIG. 2 wherein the red light-sensitive layer is considerably lower in sensitivity than the blue light-sensitive layer. For example, the density value is 1.2 for the blue light-sensitive layer, 0.17 for the green light-sensitive layer and 0.023 for the red light-sensitive layer when exposing a color printing paper to a white light. For this reason, it is necessary to expose the color printing paper to a red image on the black-and-white CRT for hundreds of seconds.

OBJECTS OF THE INVENTION

It is, therefore, an object of the invention to provide a method and apparatus for making a print sheet with a composite image not only at a low cost but also with improved efficiency.

It is another object of the present invention to provide a method and apparatus with which is convenient to make a large number of print sheets with composite images at a time.

It is still another object of the present invention to provide a method and apparatus in which a figure image and personal data matching the figure image to be printed can be easily correctly edited.

It is a further object of the present invention to provide a method and apparatus which produces a print sheet with a high quality image even in a shortened time of exposure.

SUMMARY OF THE INVENTION

In accordance with the present invention, the CRT printing method and apparatus comprises means for recording and reproducing a number of figure images which are produced by means of a TV camera, means for storing literal information of personal data matching the figure images which are prepared separately from the figure images, means for editing a composite image of the figure image and the personal data by the aid of a computer, and means for displaying, on a CRT screen, the composite image, to which image a printing paper is exposed in order to make a print.

According to a feature of the present invention, the figure images and personal data are retrieved from separate recording media such as video signals to be displayed as a composite image on a CRT monitor for editing. The composite image is, when printing it on a printing paper, displayed as a black-and-white image on the printing CRT. In the case of making color prints, the composite image is dispalyed on the printing CRT as black-and-white images in a brightness pattern each corresponding to the blue, green or red monochromatic image of the composite image. A color printing paper is exposed to the respective monochromatic images on the printing CRT, in sequence, by the use of blue, green and red color filters.

According to another feature of the present invention, the printing CRT, which comprises a black-and-white CRT, is adapted to display three primary color images of the composite image, namely blue, green and red in this order, as brightness-corresponding black-and-white images to which a color printing paper is exposed. The black-and-white CRT contains a mixture of fluorescent substances P45 and P22, in the ratio between 1:3 and 1:5. This black-and-white CRT has a high fluorescent luminance in the wavelength range of red. This makes it possible to considerably reduce the exposure time for which a color printing paper having a low spectral sensitivity to red is to be exposed.

BRIEF DESCRIPTION OF DRAWINGS

The description refers to the accompanying drawings in which like reference characters refer to like parts throughout the several views, and in which.

DETAILED DESCRIPTION OF THE INVENTION

Referring now to the drawings in more detail and particularly FIGS. 4 through 8, there is shown a specific embodiment of the present invention which is applied to an identification card printing apparatus.

Figure 4:
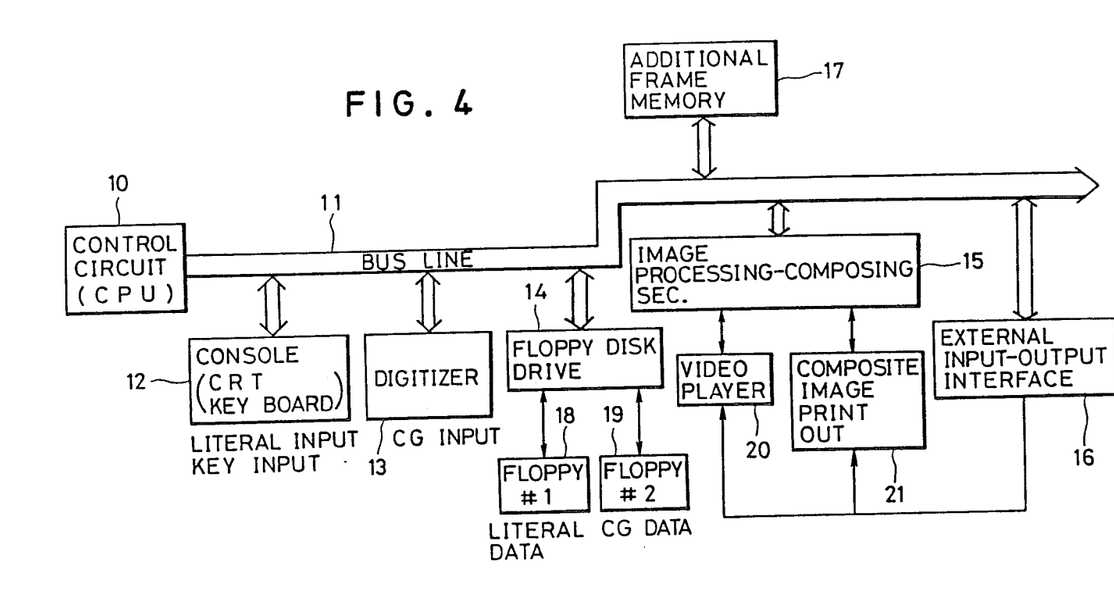
FIG. 4 is a schematic block diagram showing the CRT image printing apparatus according to an embodiment of the present invention.
Figure 5:
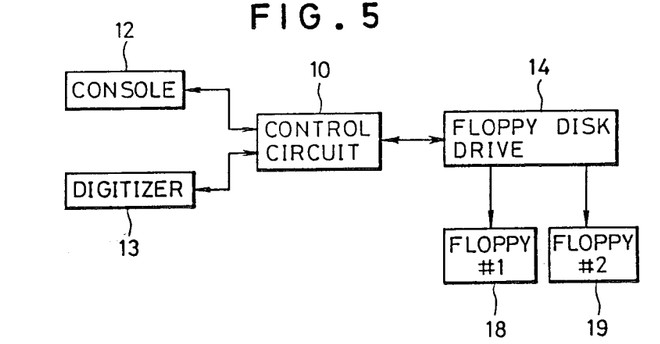
FIG. 5 is a block diagram showing an information entering section of FIG. 4.

The identification card printing apparatus generally comprises a console 12 including a display device such as a CRT and a keyboard through which personal data for an identification cardholder is prepared in a hitherto known way while displaying those data as an image on a screen of the CRT, a digitizer 13 for entering a computer graphic image of a company mark/or line drawings, a floppy disk driving device 14 for recording the personal data and the graphic image on floppy disks 18, 19, respectively, and an image processing-composing section 15 for processing a figure image from a video player 20 and composing that figure image with the image reproduced from the personal data and the computer graphic image, all of which are connected to a bus line 11 of a control circuit or central processing unit (CPU) 10 so as to transfer data mutually.

As shown in detail in FIG. 4, the personal data and the computer graphic image are recorded on the floppy disks 18, 19. The personal data including, in a suitable format or positional arrangement, the name, the date of birth, an employee number and so on for describing or identifying an identification cardholder is entered with the aid of the keyboard in the console 12 and stored in a page of the floppy disk 18 through the control circuit 10. The personal data for a number of employees are usually stored and read out in numerical order. However, in the case of an extremely large number of employees, it is desirable to store and read out the personal data in random order with reference to employee numbers. Usually identification cards include captions, for example "NAME", "DATE OF BIRTH", etc. These captions are previously stored in a suitable format or positional arrangement in an additional frame memory 17 which is also connected to the control circuit 10 through the bus line 11. The captions are displayed as images on the screen of the CRT upon entering the personal data. Through the digitizer 13, the information as to the computer graphic image and the positions where the computer graphic image is displayed on the screen of the CRT are entered and stored in the floppy disk 19.

Figure 6:
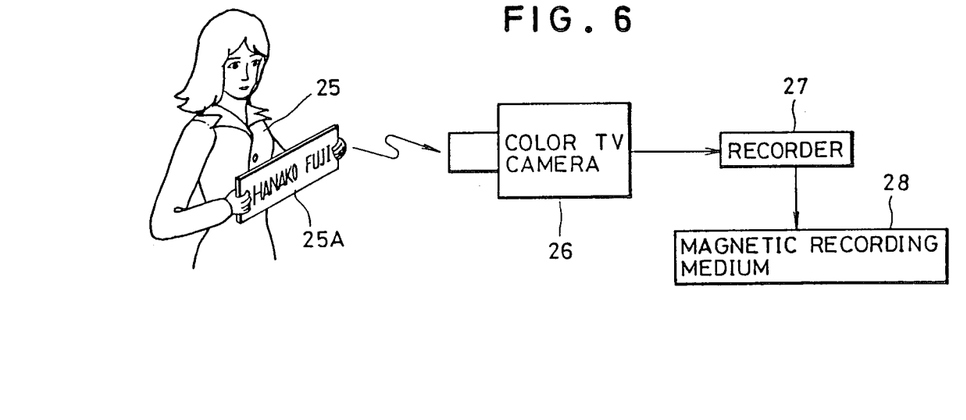
FIG. 6 is a block diagram showing a video recording apparatus.

For providing the figure image to be reproduced by the video player 20, an external information source such as a magnetic recording medium is combined with the video player 20. As shown in FIG. 6, an image of a person 25 is picked up by a color TV camera 26 and recorded on a magnetic recording medium 28 through a recorder 27. This image recording is repeated for a number of employees in order of application number.

As the TV camera, either a video tape camera or a still video camera may be used. In the case of the video tape camera, a video tape is used as the magnetic recording medium 28. When using a video tape of ¾-inch width and recording for ten seconds per person, a 60-minute spool of tape can record images for 360 persons thereon. On the other hand, in the case of a still video camera, a video floppy disk is used and can record frame images for 24 persons per disk.

Figure 7:
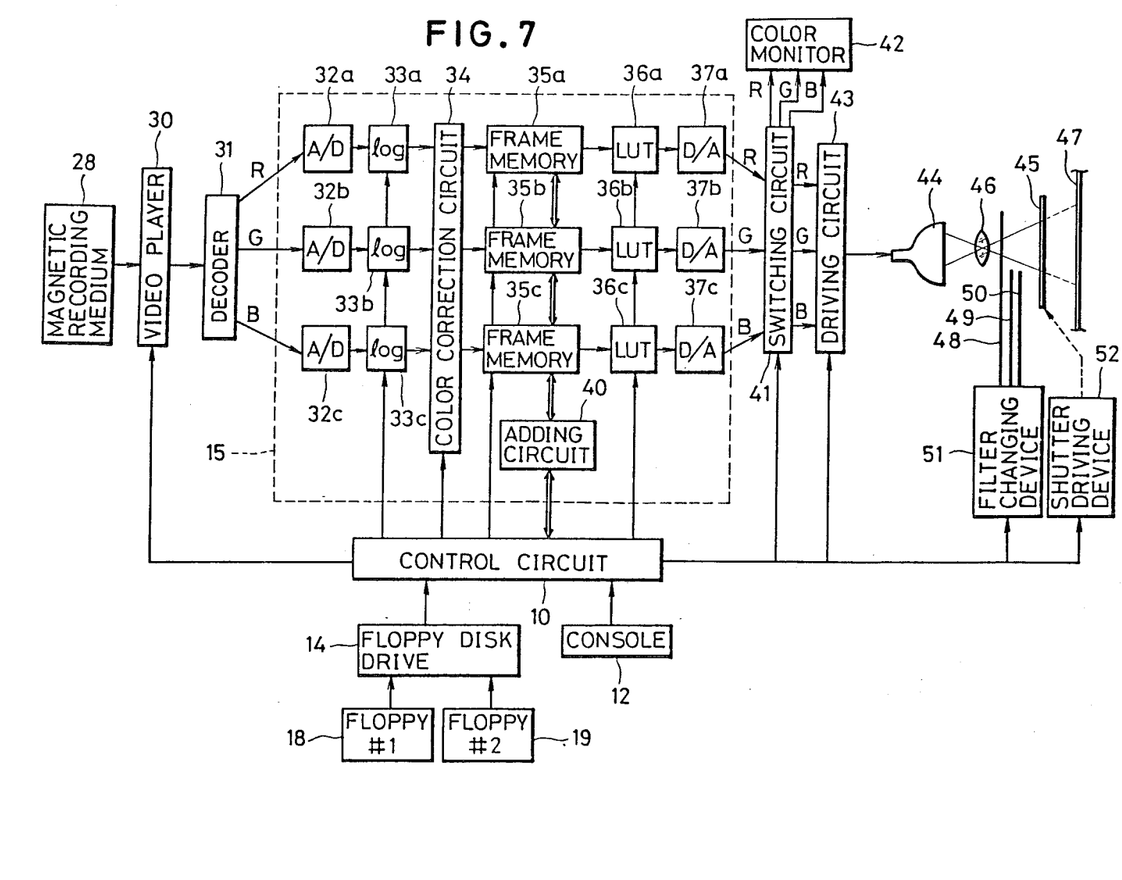
FIG. 7 is a block diagram showing an image composing section of FIG. 1.

As shown in FIG. 7, the magnetic recording medium 28 on which a number of figure images are recorded is connected to the image-reproducing device 30 to supply figure image information to the image processing-composing section 15 in the form of a video signal in NTSC system, after having been separated into blue (B), green (G) and red (R) video signals by a decoder 31. In the image processing-and-composing section 15, there are three processing-and-composing circuits, one for each color: blue, green and red.

The red image video signals (R) are converted into digital signals through A/D converter 32a and then transmitted to a logarithmic transforming circuit 33a to be transformed into density signals for respective picture elements. The density signals are subjected to corrections for the difference in spectral characteristics between the TV camera and the color printing paper and for the improper absorption of dye of the color printing paper in a color correction circuit 34. In a frame memory 35a there are stored red density signals which are respectively the added values of density signals of the statement image and the computer graphic image read out from the floppy disk 18, 19. The red density signals in the frame memory 35a are read out and added to the density signals from the color correction circuit 34 in an adding circuit 40. The resulting red density signals are again stored in the frame memory 35a as composite image signals. The red composite image signals, after having been corrected in accordance with the gradient characteristics of the color printing paper in a reference or look-up table (LUT) 36a, are converted, by D/A converter 37a into analog signals which in turn are transmitted either to a color monitor 42 or to a CRT 44 through a switching circuit 41. Because the same sequential operations as for red are performed for green and blue, the description of the other processing-and-composing circuits 32b to 37b and 32c to 37c is omitted.

The switching circuit 41 is adapted to transit selectively three-color composite image signals either to the color monitor for editing a composite image on the screen of the color monitor 42 or to the CRT 44 through a driving circuit 43 for printing. The driving circuit 43 derives the three-color composite image signals sequentially by color to display composite monochromatic images on the screen of the CRT 44 one by one.

For this CRT 44, there is used a black-and-white CRT so as to thereby display on its screen a black-and-white image in the form of a brightness pattern for every monochromatic composite image. A color photographic or printing paper 47 is exposed to the black-and-white image on the screen of the black-and-white CRT through a lens 46 when shutter means 45 is opened. During this exposure, three primary color filters 48, 49, 50 are selectively sequentially inserted between the lens and shutter means under the control of a filter changeover device 51 so as to create a monochromatic composite image to which the color printing paper 47 is exposed in sequence. In such the way the color printing paper 47 is exposed to three different monochromatic composite images, namely blue, green and red images, in this order. The shutter 45 is controlled by a driving device 52 in such a way as to be closed during the changeover for the filters 48 and 50 and the advancement of the color printing paper 47. It is desirable to use as the color paper 47 a thin color paper of 100 to 150μ thickness for preventing a card to be made from that color paper from warping.

The control circuit 10 controls the operation of the image processing-composing section 15, the data entry in the logarithmic transforming circuits 33a to 33c and the look-up tables 36a to 36c, the writing of calculation formulas in the color correction circuit 34, and the reading out of data from the frame memories 35a to 35c and the writing of additional data therein.

In this embodiment, the image-reproducing device 30 may be replaced with a color TV camera which, for example, has three image pickup tubes so as to provide color-separated video signals, namely, blue (B), green (G) and red video signals which is turn are transmitted to the respective image processing-and-composing circuits of the image processing-and-composing section 15.

When it is required to print images that are transmitted through telecommunication lines, audio signals, after being modulated by a modem, are transmitted to the decoder 31.

Figure 8:
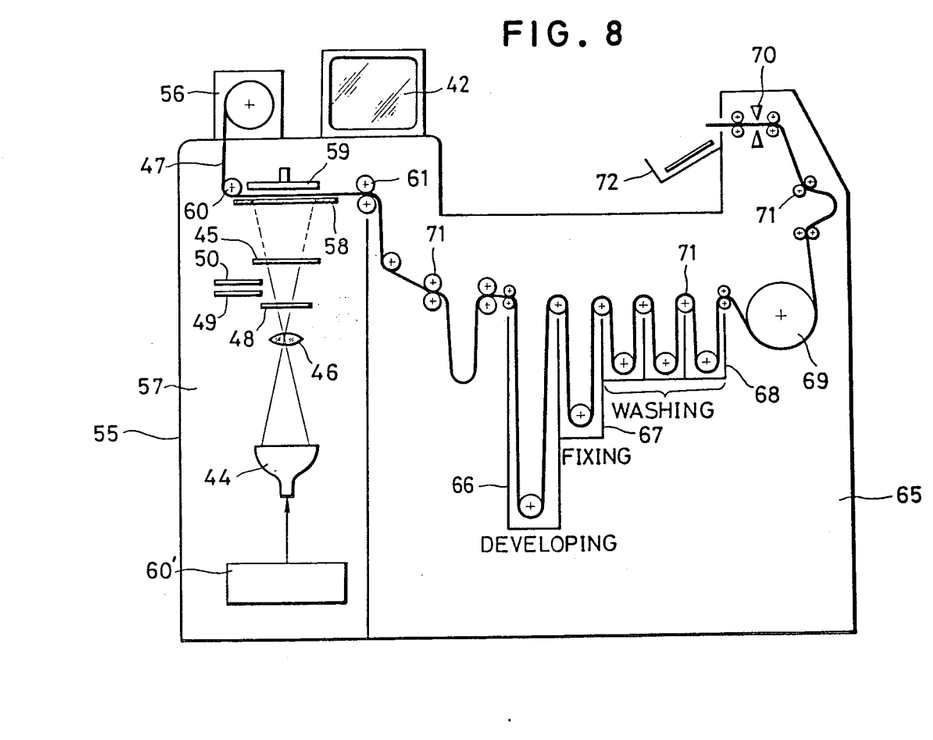
FIG. 8 is an illustration of a hard printer which is a part of the apparatus of this invention.

The composite image displayed on the screen of the CRT 44 is printed out by an output printer 21 shown in FIGS. 4 and 8. Referring in particular to FIG. 8, the output printer 21 comprises an exposure section 57 and a processing section 65 arranged in a housing 55. At the top on the left hand side of the housing 55, there is a printing paper magazine 56 detachably mounted thereon wherein a roll of color printing paper 47 is loaded. As was previously mentioned referring to FIG. 2, the color printing paper 47 has the spectral sensitivity characteristic that the sensitivity is considerably lower in the wavelength range of red than of blue. In the exposure section 57, there are disposed the black-and-white CRT 44, shutter 45, printing lens 46, three color filters 48 to 50 all of which were previously described in connection with FIG. 7, an exposure aperture plate 58 and a pressure plate 59.

Figure 3:
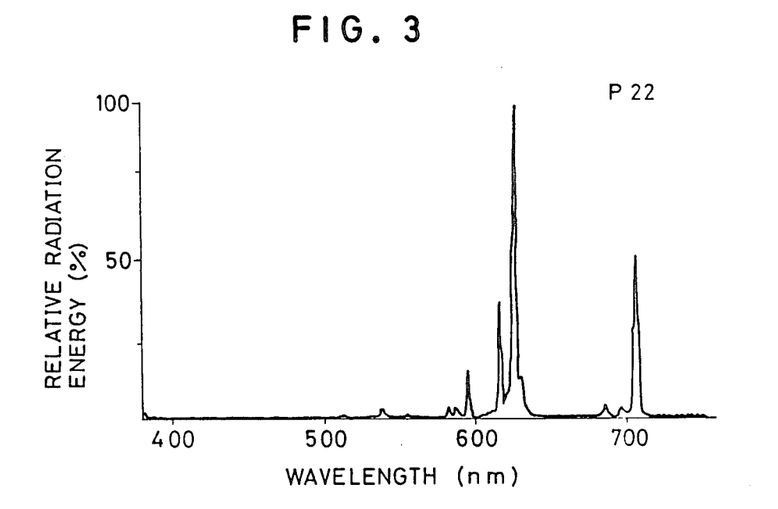
FIG. 3 is a graph showing the spectral luminance characteristic of a black-and-white CRT wherein P22 fluorescent substance is used.
Figure 9:
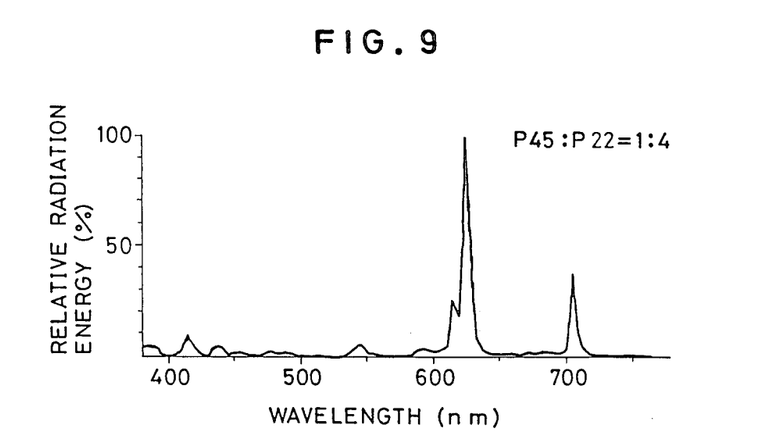
FIG. 9 is a graph showing the spectral luminance characteristic of a black-and-white CRT which uses a mixture of fluorescent substances P45 and P22, in the ratio of 1:4.

The black-and-white CRT 44 has a high luminance characteristic for reducing the exposure time of the color printing paper. It should be noted that the screen of the black-and-white CRT contains a mixture of fluorescent substances of P45 and P22 (whose spectral luminance characteristic is shown in FIG. 3), in the ratio between 1:3 and 1:5, preferably in the ratio of 1:4. The black-and-white CRT which uses a mixture of fluorescent substances of P45 and P22 in the ratio of 1:4 exhibits the spectral luminance characteristic shown in FIG. 9 wherein peak energy is emitted at 620 nm for the maximum and 710 nm for the second highest. As can be clearly understood from FIG. 9, the above-described black-and-white CRT exhibits fluorescent luminance which is high in the wavelength range of red and low in the wavelength range of blue. As a result, although the color printing paper 47 has a low spectral sensitivty to red and a relatively high spectral sensitivity to blue, the exposure time for red is considerably reduced to about one second, which is almost equal to that of blue, resulting in well-color-balanced prints.

Figure 10:
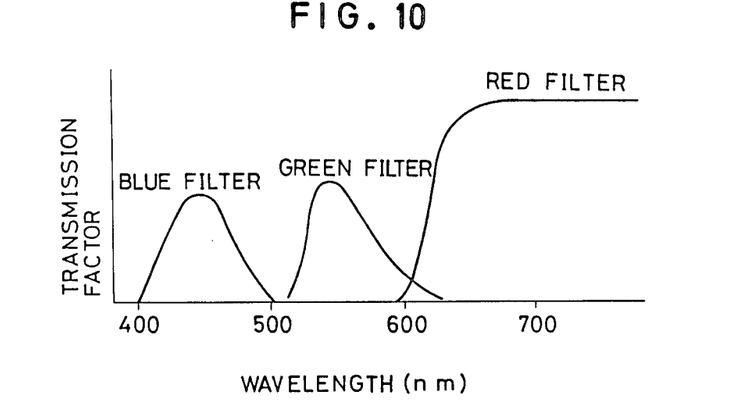
FIG. 10 is a graph showing the transmittance factors of color filters.
Figure 11:
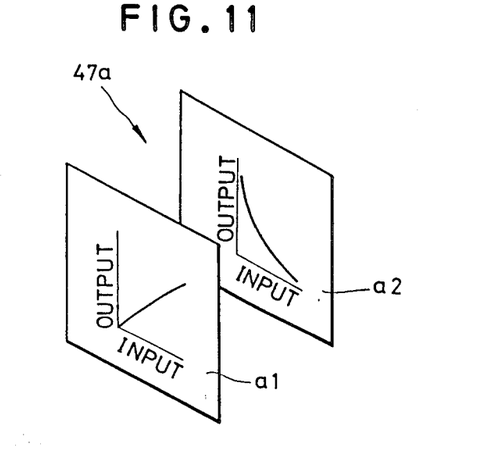
FIG. 11 is an illustration showing reference tables.
Figure 12:
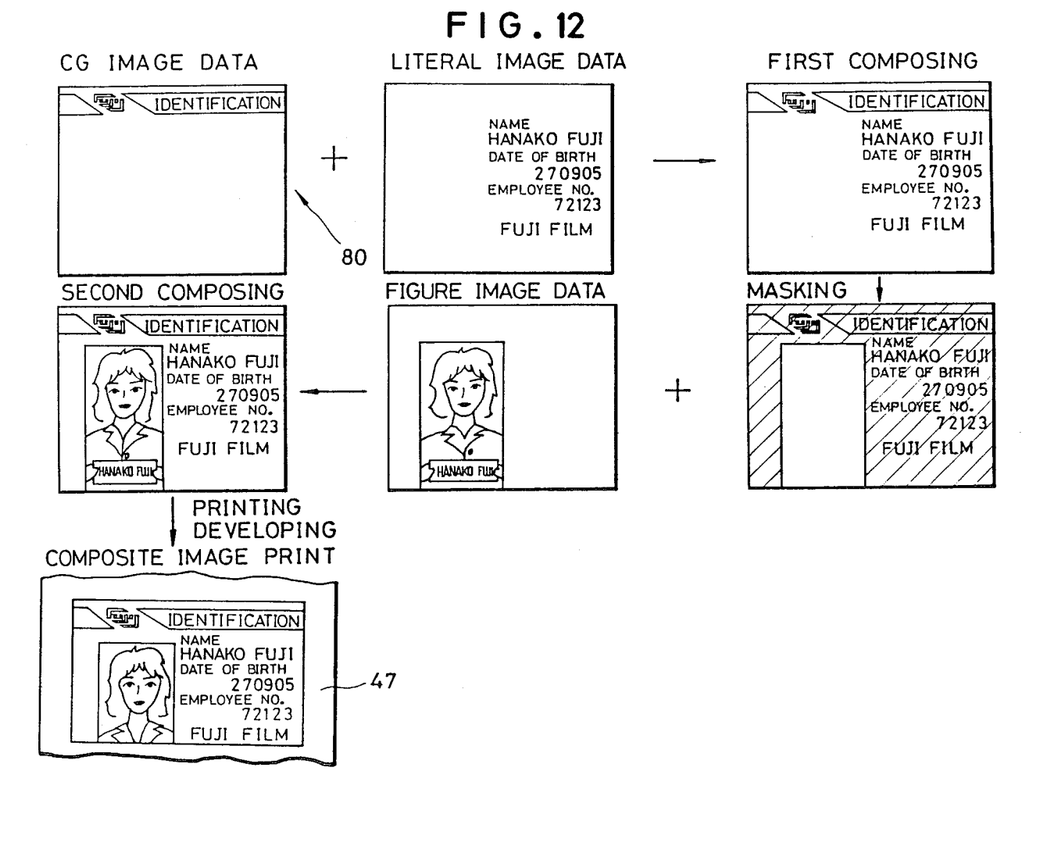
FIG. 12 is an explanatory illustration showing the sequence of making a CRT composite image print sheet.

The color printing paper 47 is exposed for about one second to each of black-and-white images which are sequentially displayed in a brightness distribution corresponding to the respective monochromatic composite images on the screen of the black-and-white CRT 44. As previously described, these exposures are made through the corresponding color filters 48 and 50 whose light transmission factors are shown in FIG. 10. In place of the color filters 48 to 50 separately provided, it is permissible to provide a rotatable disk holding three color filters circularly therein in such a way as to position these filters in the optical path of the lens 46 in sequence.

The color printing paper 47 is withdrawn from the magazine 56 to an exposure position about a guide roller 60 by a pair of nip rollers 61, and is held flat between the exposure aperture and pressure plates 48, 59 at the exposure position. There the color printing paper 47 is exposed sequentially by frames, each frame being exposed successively to the three monochromatic images each of which is an image that is displayed on the black-and-white CRT and transmitted through one of the color filters 48 and 50.

In processing section 65 on the right hand side of housing 55, there is an automatic print processor comprising a developing tank 66, a fixing bath 67, a washing bath 68, a rotary dryer 69, a cutter 70, and a plurality of automatic carrying rollers 71 disposed therebetween. The exposed color printing paper 47 is automatically passed through these tanks and bath in succession, dried and then cut frame by frame. Prints thus finished are discharged into an external tray 72.

The controller 60' which includes therein the control circuit 10 is adapted to control the transportation of the color printing paper 47, the temperature of the developer in the developing tank 66 and of the rotary dryer 69 and the operation of the cutter 70. The color monitor 42 displays the color composite image to be printed on its screen in order to allow an operator to make any necessary corrections, for example color correction, density correction and so on, while viewing the color composite image on the monitor screen, with the aid of keyboard in the console 12.

A further understanding of the method of making employee identification cards by there CRT image printing apparatus of the present invention will be had from the following description referring to FIGS. 2 and 12 through 15.

For preparing a composite image by the image processing and composing section, the image to be reproduced on an employee identification card has first to be received by the color TV camera 26 in such the way shown in FIG. 6.

The color TV camera 26 picks up the image of the upper half of a person 25 who has at his or her chest a data plate 25A on which his or her name and/or employee number is shown and records the information of the image on the magnetic recording medium 28 by the video recorder 27. This image gathering is executed for a number of employees in order of receipt number, while the correspondence between the name and employee number of each person is verified.

On the other hand, an operator prepares the necessary personal data for describing or identifying each person such as the name, the date of birth, the employee number and so forth with the aid of the keyboard and stores the information in #1 floppy disk 18, while the data are displayed in a predetermined format on the color monitor 42. The preparation of the necessary personal data is executed for a number of employees at a time in order of employee number. The operator also prepares the computer graphic design such as a company mark with the aid of the digitizer 13 and stores the information in #2 floppy disk 19.

For editing a composite image on the color monitor 42, the image of the computer graphic design is first to be arrayed at an upper portion of an identification sheet 80. For this purpose, the information concerning the computer graphic design is retrieved from the floppy disk 19 with the aid of the keyboard. At this time, since the information is stored in the floppy disk 19 as separate color signals, the respective color signals are read out by color to be written in the frame memories 35a to 35c provided for each color. In order to display the information as a color positive image on the color monitor 42, the control circuit 10 causes each respective look-up table 36a to 36c to select a positive transforming mode.

Next, the operator prepares the personal data of the person whose identification card is now being made by entering his or her employee number via the keyboard. His or her personal data are retrieved as well as the data of its positional arrangement from #1 floppy disk 18, color-by-color, and is added, after being transformed to the data of picture elements, to the data of the computer graphic design, again color-by-color, in the adding circuit 40. As a result, each frame memory 35a to 35c is rewritten with the resulting data so as to display the personal data and the computer graphic design as a color composite image on the color monitor 42, while an area on the left hand side of the identification sheet 80 allotted for insertion of a figure image is left blank on the color monitor 42.

Finally, the operator provides the upper half figure image of the person whose identification card is being made, by starting the video player 30, which transmits video signals of a number of upper half figure images in recorded order to the decoder 31, where the video signal is separated into three color video signals, namely blue (B), green (G) and red (R). Each color video signal of an upper half figure image is processed by the respective processing and composing circuit in the processing and composing section 15 as was previously described in connection with FIG. 7; however, in the adding circuit 40, the data for each upper half figure image are, after color correction, added to the previously stored data in each frame memory, while masking an area of the identification sheet 80 expecting the area for insertion of the upper half figure image. With the resulting data for each color, each frame memory 35a to 35c is rewritten. As a result, an upper half figure image is displayed in color on the color monitor 42. It is to be noted in this embodiment that each frame memory 35a to 35c comprises 512×512 picture elements each being allotted eight bits to express gradation.

On the monitor 42 there is displayed an upper half figure image including the data plate 25a, one after another, in the allotted area, while the images of the computer graphic design and the personal statement information are kept unchanged. At the time of each display, the operator inspects the images to determine whether the name or employee number in the upper half figure image coincides with the name or employee number in the personal data. When these coincide, the operator after confirming that the composite image is good in color balance and gradation, enters an instruction to print, via the keyboard in the console 12. However, if there is no coincidence, the upper half figure image is replaced with others, one by one, keeping the images of the personal statement information and the computer graphic design until the name or employee number and the personal data and the upper half figure image match each other.

When the instruction to print is entered, the control circuit 10 causes each look-up table 36a to 36c to select a negative transforming mode and simultaneously causes the switching circuit 41 to transmit the respective color video signals R, G, B from the image processing and composing section 15 to the CRT driving circuit 43 so as to display black-and-white images on the screen of the black-and-white CRT 44.

To describe this more fully, the image display and printing are effected as follows:

Because the look-up tables 36a to 36c are in the negative transforming mode, data that are transmitted to the CRT driving circuit 43 are of the reversed image of each monochromatic composite image. The CRT driving circuit 43 is adapted to cause the black-and-white CRT 44 to scan on its screen in the direction opposite to the normal scanning direction, namely from right to left, thereby to display the mirror image of each composite image. When the blue composite image is displayed as a black-and-white image of the screen of the black-and-white CRT 44, the blue filter 48 is selected and positioned in the optical path of the lens 46. At this time, the shutter 45 is opened for a period of time which is predetermined in accordance with the sensitivity of the color printing paper 47 to blue light so as to make a proper exposure. Although the upper half figure image is displayed over almost all of the screen of the black-and-white CRT 44, the exposure aperture mask 58 overlaps the projected image so as to hide the lower half thereof including the data plate 25a, whereby no image of the data plate 25a is printed on the color printing paper 47. After the exposure of the blue composite image, the green filter 49 is positioned in the optical path just after the blue filter 48 has left, simultaneously with the display of the green composite image as a black-and-white image on the screen of the black-and-white CRT 44. In the same manner as for the blue composite image, the color printing paper 47 is exposed to the green and red composite images in sequence. When the exposure of the color printing paper 47 in the three color frame sequence exposure system is completed, the nip rollers 61 advance the color printing paper 47 by one frame and position an unexposed part thereof between the exposure mask 58 and the pressure plate 59.

The above-described operations are repeated as many times as required. When a predetermined number of exposures are effected, the color printing paper 47 is automatically cut off after the last frame, and the exposed color printing paper 47 is processed be being passed automatically through the developing tank 66, the fixing bath 67 and the washing bath 68 in that order. The color printing paper 47 thus processed after being dried by the rotary dryer 69, is cut off frame-by-frame by the cutter 70 to provide separate identification print sheets 75 with individual different composite images.

Figure 13:
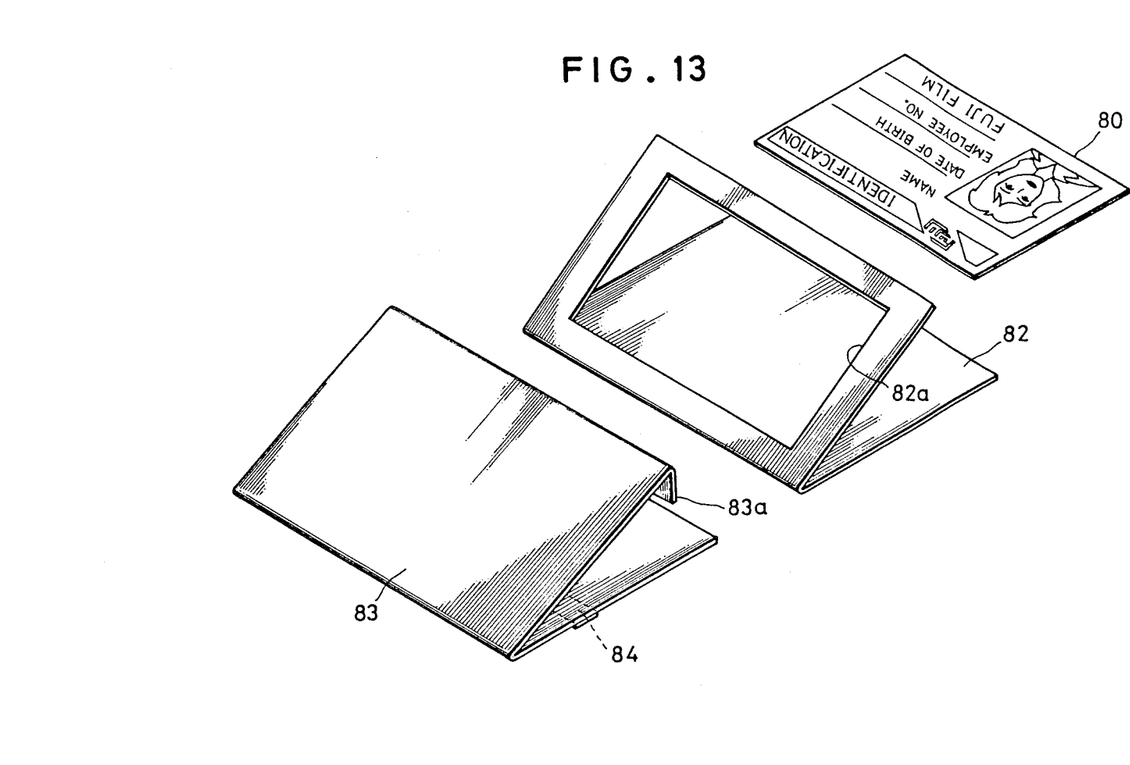
FIG. 13 is a perspective, exploded view of an identification card.
Figure 14:
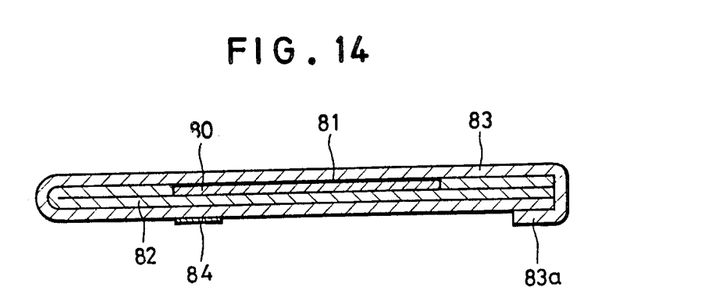
FIG. 14 is a cross sectional view of the identification card of FIG. 13 wherein component sheets are pressure-welded with heat.
Figure 15:
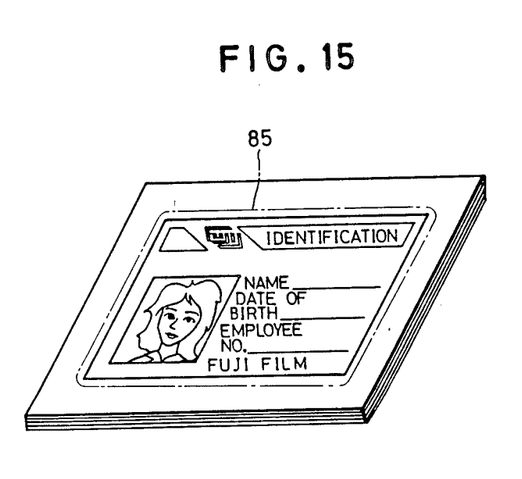
FIG. 15 is a perspective view of the identification card before being punched out.

The identification sheet 80 is, as shown in FIG. 13, mounted in a frame 82a of a core sheet 82 folded in two, after the application of a heat-weldable bonding agent 81 over all the printed surface (see FIG. 14). For this core sheet 82, is is preferable to use a sheet of a plastic such as a white polyvinyl chloride resin. The folded core sheet 82 with the identification print sheet 80 mounted therein is inserted between the leaves of a colorless, transparent tow-fold cover sheet 83 which is preferably made of, for example, a polyvinyl chloride which is pressure-weldable to the core sheet 82 with heat. On the back of the cover sheet 83 there is a magnetic strip 84 attached thereto. Designated by numeral 83a is a flap for preventing the inserted core sheet 82 from slipping out.

The sheet assembly comprising the identification print sheet 80, the two-fold core sheet 82 and the two-fold cover sheet 83 is pressed and heat so as to heat-weld the core and cover sheets 82, 83 together. At this time, the printed surface of the identification print sheet 80 is heat-welded to the front half of the cover sheet 83 through the heat-weldable bonding agent 81 previously applied to the identification print sheet 80 on the printed surface. The sheet assembly thus heat-welded is stamped out using a press die of a shape shown by a dotted chain line in FIG. 15 to provide a complete identification card. In this embodiment, because of the heat-welded bonding agent 81, the identification print sheet 80 is firmly attached to the cover sheet 83, whereby not only is not air or liquid able to penetrate even under hard scrubbing, but also the replacement of the figure picture and/or the personal data, i.e. forgery, is prevented.

Of course, a black-and-white printing paper can be used for making a print of a black-and-white picture.

In place of the above-described frame sequence exposure system, a line sequence exposure system may be used. In this case, a CRT having a flat screen should be used and the printing paper is intermittently moved for line exposure. If a CRT having a screen which can display three-color scanning lines at a time is used, high speed printing can be realized.

While the invention has been disclosed in connection with a preferred embodiment thereof, it will be recognized by those skilled in the art that various modifications of the invention are possible within the spirit and scope of the following claims.

What is claimed is:

1. An apparatus for making a print from an image on a CRT display device, which comprises:
    video recording means for recording and reproducing a number of figure images in sequence, said figure images being produced by means of a TV camera;
    memory means for storing personal data corresponding to each of said figure images which are entered therein with the aid of a computer;
    means for retrieving said personal data as video signals from said memory means and said figure images as video signals from said video recording means as a composite of said retreved video signals;
    means for displaying said composite video signals as a visible composite image on a screen of said CRT display device; and
    means for producing a latent image of said visible composite image displayed on said screen of said CRT display device on a printing paper and then processing said printing paper, thereby providing a print of said composite image.

2. An apparatus as defined in claim 1, which further comprises memory means for storing computer graphic images entered therein, the stored images being able to be read out therefrom as video signals by said readout means so as to provide composite video signals on all of said readout video signals for displaying a visual composite image on said CRT display device.

3. An apparatus as defined in claim 1, wherein said memory means includes a magnetic floppy disk.

4. An apparatus as defined in claim 1, wherein said video recording-reproducing means includes a video tape.

5. An apparatus as defined in claim 1, wherein said video recording-reproducing means includes a magnetic floppy disk.

6. An apparatus as defined in claim 1, wherein said display means is adapted to display three primary colors of images of said visual composite image, namely blue, green and read, as black-and-white images thereon to which a color printing paper is exposed in sequence through corresponding colors of filters.

7. An apparatus as defined in claim 6, wherein said black-and-white CRT display device radiates energy lower in the wavelength range of red than in the wavelength range of blue.

8. An apparatus as defined in claim 7, which further comprises means for the correction of said figure image as to color and gradation.

9. An apparatus as defined in claim 8, wherein said black-and-white CRT display device has a screen which uses a mixture of P45 and P22 fluorescent substances in a ratio between 1:3 and 1:5.

10. An apparatus for making a print with a colored composite image on a black-and-white CRT display device, which comprises:
means for producing color images of a number of human figures;
means for recording said color figure images therein;
memory means for storing personal data corresponding to each of said human figures;
readout means for reading out one set of said personal data as video signals from said memory means and said color figure images as video signals in recorded order from said recording means so as to combine said video signals to produce a color composite image of said read out personal data and one of said read out color figure images which corresponds to said read out personal data;
means for displaying said combined video signals as black-and-white composite images which correspond in brightness to the three primary monochromatic composite images of said color composite image in sequence on said black-and-white CRT adapted to radiate energy which is less in the wavelength range of red than of blue;
an optical system for exposing a color printing paper in a roll to said black-and-white composite images on said black-and-white CRT in sequence;
three primary color filters which are selectively insertable between said optical system and said color printing paper for changing said black-and-white composite images to monochromatic composite images;
means for developing and processing said exposed color printing paper; and
means for cutting off said developed and processed color printing paper to provide a color print with said color composite image thereon.

11. An apparatus as defined in claim 10, which further comprises means for the correction of said color figure image as to color and gradation.

12. An apparatus as defined in claim 10, wherein said black-and-white CRT has a fluorescent screen whose fluorescent substance is a mixture of P45 and P22 flourescent substances in a ratio between 1:3 and 1:5.

13. A method for making a print from an image on a CRT display device, which comprises the steps of:
producing a number of figure images each of which is of the upper half of a human subject having a personal data plate below the face of said human subject;
recording said figure images on a recording medium;
storing personal data corresponding to said figure images in a memory;
reading out one set of said data from said memory and the corresponding said figure image from said recording medium and composing them as video signals with the aid of a computer;
displaying said composite video signals as a composite image selectively either on a monitor CRT or a printing CRT; and
exposing a printing paper to said composite image except a part of said image that includes said personal data plate.

14. A method as defined in claim 13, wherein said personal data on said plate include at least one of the name and an identifying number of said human subject.

15. A method as defined in claim 13, wherein an exposure mask is disposed under said printing paper so that said printing paper is not exposed to said part including said personal data plate.

16. A method as defined in claim 13, wherein said figure images are produced by a TV camera and recorded as video signals on a magnetic recording medium.

* * * * *